United States Patent
Shetty et al.

(10) Patent No.: US 11,933,441 B2
(45) Date of Patent: Mar. 19, 2024

(54) SENSOR ARRANGEMENT

(71) Applicant: Danfoss A/S, Nordborg (DK)

(72) Inventors: Veenith Shetty, Nordborg (DK); Hans-Henning Hansen, Nordborg (DK); Jens Jensen, Nordborg (DK)

(73) Assignee: Danfoss A/S, Nordborg (DK)

( * ) Notice: Subject to any disclaimer, the term of this patent is extended or adjusted under 35 U.S.C. 154(b) by 357 days.

(21) Appl. No.: 17/297,909

(22) PCT Filed: Nov. 27, 2019

(86) PCT No.: PCT/EP2019/082713
§ 371 (c)(1),
(2) Date: May 27, 2021

(87) PCT Pub. No.: WO2020/114852
PCT Pub. Date: Jun. 11, 2020

(65) Prior Publication Data
US 2022/0018475 A1   Jan. 20, 2022

(30) Foreign Application Priority Data
Dec. 5, 2018 (DE) .............. 10 2018 130 917.1

(51) Int. Cl.
| | |
|---|---|
| *G01D 11/24* | (2006.01) |
| *B23K 1/19* | (2006.01) |
| *F16L 41/00* | (2006.01) |
| *F16L 41/08* | (2006.01) |

(52) U.S. Cl.
CPC .............. *F16L 41/008* (2013.01); *B23K 1/19* (2013.01); *F16L 41/084* (2013.01); *G01D 11/245* (2013.01)

(58) Field of Classification Search
CPC ................................. B23K 1/19; F16L 41/008
See application file for complete search history.

(56) References Cited

U.S. PATENT DOCUMENTS

| | | | |
|---|---|---|---|
| 4,573,497 A | 3/1986 | White | |
| 4,675,643 A | 6/1987 | Tanner et al. | |
| 5,884,651 A | 3/1999 | Vestergaard et al. | |
| 6,158,995 A * | 12/2000 | Muramatsu | F16L 41/082 418/248 |

(Continued)

FOREIGN PATENT DOCUMENTS

| | | |
|---|---|---|
| CN | 101408267 A | 4/2009 |
| CN | 102275023 A | 12/2011 |

(Continued)

OTHER PUBLICATIONS

International Search Report for PCT Serial No. PCT/EP2019/082713 dated Feb. 10, 2020.

*Primary Examiner* — Jamel E Williams
(74) *Attorney, Agent, or Firm* — McCormick, Paulding & Huber PLLC

(57) ABSTRACT

A sensor arrangement (1) is described comprising a sensor housing (2) and a mounting connector (3). Such a sensor arrangement should be soldered to a refrigeration system without being sensitive for vibrations during operation of the system and without deteriorating a sensor arranged in the housing. To this end the mounting connector (3) is at least partly made of a bi-metal material with an inner layer (10) of steel and an outer layer (11) of copper.

20 Claims, 2 Drawing Sheets

(56) References Cited

U.S. PATENT DOCUMENTS 6,186,556 B1 * 2/2001 Masuyama ........... F04C 23/008
　　　　　　　　　　　　　　　　　　　　285/332.1

FOREIGN PATENT DOCUMENTS

| CN | 105299369 A | * | 2/2016 |
| CN | 105299369 A |   | 2/2016 |
| DE | 694 18 200 T2 |   | 9/1999 |
| DE | 102008054226 A1 |   | 5/2010 |
| JP | 59116025 A | * | 7/1984 |
| JP | S59116025 A |   | 7/1984 |

* cited by examiner

SENSOR ARRANGEMENT

CROSS-REFERENCE TO RELATED APPLICATIONS

This application is a National Stage application of International Patent Application No. PCT/EP2019/082713, filed on Nov. 27, 2019, which claims priority to German Patent Application No. 102018130917.1 filed on Dec. 5, 2018, each of which is hereby incorporated by reference in its entirety.

TECHNICAL FIELD

The present invention relates to a sensor arrangement comprising a sensor housing and a mounting connector.

BACKGROUND

The sensor arrangement is in particular a pressure sensor arrangement which can be used to determine the pressure of refrigerants flowing in cooling systems to monitor status and/or control the operation of such systems. Such systems comprise in many cases copper tubes and pipes because of high corrosion resistance, long-term reliability and fast and cheap installation costs.

For connecting such a sensor arrangement with the system, it is a common practice to solder the sensor arrangement to a tube, pipe or other part of the system. To this end it is possible to use a hole in the part of the system which has before being built into the part.

When the part of the system is made of copper it is of advantage to use a mounting connector which is of copper as well rather than to use dissimilar materials. The installation of the sensor arrangement at the system can be made on remote sides with just a propane torch and solder.

In order to make possible such a connection between the sensor arrangement and the part of the system, prior art pressure sensor devices are provided with a thin and relatively long connecting tube of copper. This connecting tube can be brazed to the sensor arrangement, more precisely to the housing of the sensor arrangement.

Due to the high thermal conductivity of the copper material, the length of the copper tube must be adequate to prevent too much heat transfer from the soldering end of the tube to the pressure sensor during the soldering operation of the pressure sensor device into the system. Excessive temperature may deteriorate or even destruct a sensor element located in the housing.

However, such thin and relatively long connecting tubes are sensitive for vibrations during operation of the system or they can experience physical damage.

SUMMARY

The object underlying the invention is to provide a sensor arrangement which can be soldered to a system and which avoid problems related to vibrations or shock situations.

This object is solved with a sensor arrangement as described at the outset in that the mounting connector is at least partly made of a bi-metal material with an inner layer of steel and an outer layer of copper.

Steel, preferably stainless steel, has a thermal conductivity which is lower than that of copper. Thus, the bi-metal tube conducts far less heat to the sensing element of the sensor arrangement than the prior art solutions. Nevertheless, the copper on the outside of the mounting connector allows for a simple connection of the sensor arrangement to the system by brazing. Due to the improved thermal properties, the length of the mounting connector can be reduced, which both saves space and improves the resistance against damage by vibrations or shocks.

In an embodiment of the invention the connector is a deep-drawn part. Deep-drawing is a cost-effective way of producing the mounting connector.

In an embodiment of the invention the deep-drawn part is made of a copper cladded stainless-steel sheet material. When the steel sheet material is cladded with the copper layer, a durable and reliable connection between the copper and the steel is achieved. The connection between the copper and the steel is not affected by the deep-drawing process.

Additionally or alternatively, the deep-drawn part is coated with a copper layer after deep-drawing. Such a coating can be used, if the cladded copper layer is not thick enough or when the steel sheet material is deep-drawn without a copper layer. The coating with the copper layer then produces a mounting connector having the desired properties.

In an embodiment of the invention the inner layer comprises a thickness in a range from 0.2 to 2 mm, in particular from 0.7 to 1.5 mm. Such a thickness ensures enough stiffness, on the one hand and keeps the thermal conductivity at sufficiently low level on the other hand.

In an embodiment of the invention the outer layer comprises a thickness in a range from 5% to 20% of the thickness of the inner layer. This ensures good soldering properties and at the same time a low thermal conductivity.

In an embodiment of the invention the connector is connected to a mounting section of the housing, wherein the mounting section comprises a recess and the connector comprises a flange, wherein the flange is arranged in the recess. The mounting connector can then be axially welded to the mounting section at a radial outer edge of the flange. This produces a reliable connection between the mounting connector and the housing.

In an embodiment of the invention the flange is free of copper. The absence of copper in the welding area improves the strength of the welding between the mounting connector and the mounting section.

In an embodiment of the invention the mounting section comprises a step. The step provides an additionally distance between the mounting connector and the interior of the sensor housing. The front face of the step can be used to fix the mounting connector to the housing.

In an embodiment of the invention the mounting section comprises a protrusion extending from the mounting section. The mounting connector can then not only be fixed to the mounting section, but can also surround the protrusion.

In an embodiment of the invention the protrusion extends from a front face of the step. Accordingly, it can protrude into the interior of the mounting connector.

In an embodiment of the invention the mounting connector is in form of a connector tube. A connector tube can have a certain length so that heat produced during soldering of the mounting connector to the system is not directly transferred to the sensor housing.

In an embodiment of the invention the connector tube is of cylindrical form. In this case it is not necessary to have a predetermined angular position of the sensor arrangement with respect to the system, when mounting the sensor arrangement to the system.

In an embodiment of the invention the connector tube comprises at least a first section having a first diameter and a second section having a second diameter smaller than the first diameter, wherein the first section is arranged closer to the housing than the second section. This facilitates the welding of the mounting connector to the housing. The first section can surround the protrusion, for example with a small gap. This ensures escape of gases from the welding process.

In an embodiment of the invention the connector tube comprises at least a third section having a third diameter smaller than the first diameter and the second diameter, wherein the third section is arranged at an end of the connector tube remote from the mounting area. The diameter of the third cylindrical section is adapted to be inserted into the receptacle of a system. The step formed between the second and the third section forms an insertion stop surface.

In an embodiment of the invention the third section comprises an opening in an end section. The opening allows access of fluid into the sensor arrangement.

BRIEF DESCRIPTION OF THE DRAWINGS

The invention will now be described in more detail with reference to the drawing, wherein.

DETAILED DESCRIPTION

Figure 2:
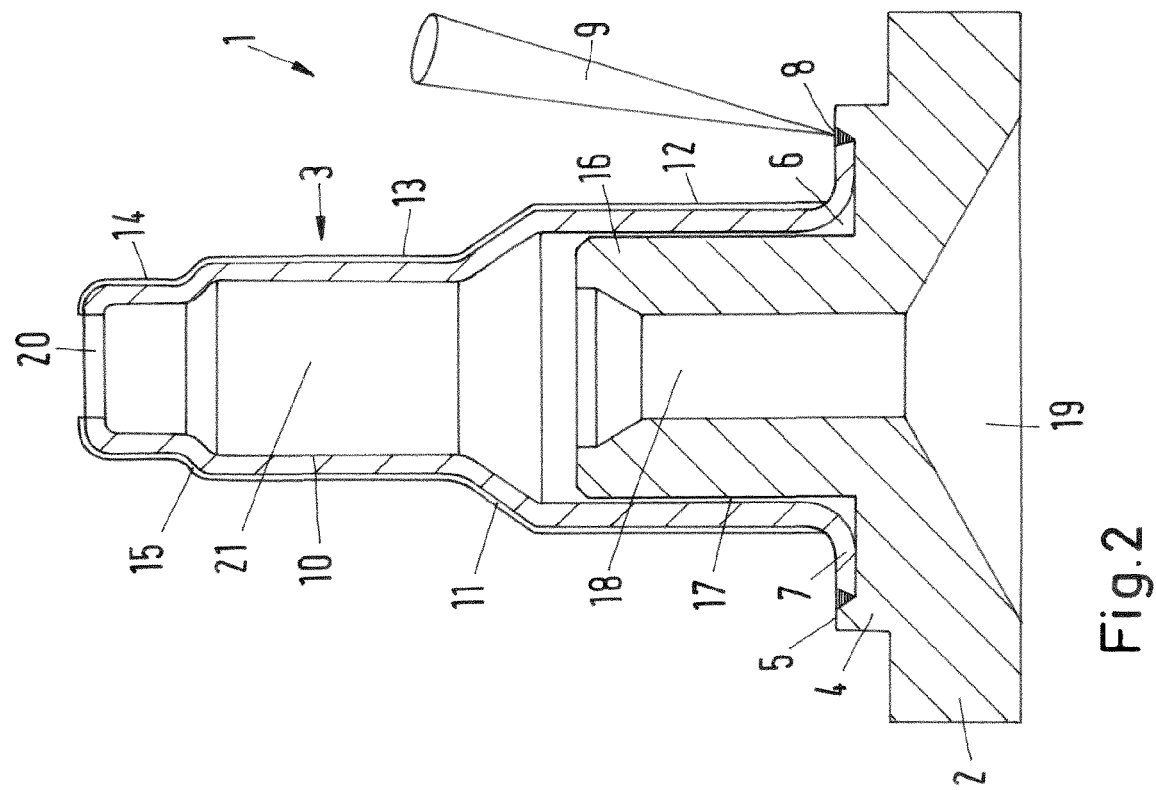
FIG. 2 shows a sectional view of a part of a housing and a mounting connector.
Figure 1:
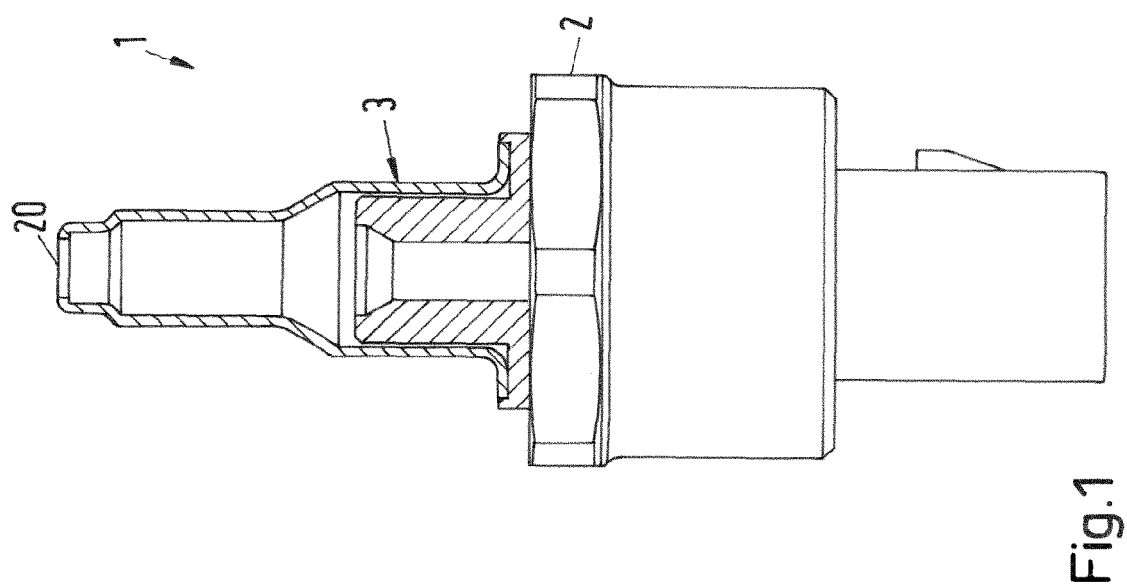
FIG. 1 shows a side view of a sensor arrangement, partly broken away.

FIG. 1 shows a sensor arrangement 1 comprising a sensor housing 2 and a mounting connector 3. The mounting connector 3 is fixed to the housing 2 by welding or any other suitable connecting method.

The housing 2 comprises a step 4. The step 4 comprises a front face 5 to which the mounting connector 3 is mounted. To this end the front face 5 comprises a recess 6 and the connector 3 comprises a flange 7 which is bent radially outwardly by approximately 90°. The flange 7 is inserted into the recess 6. A welding seam 8 can then be produced by a laser beam 9, wherein the welding seam 8 is arranged between the radially outer most end of the flange 7 and the radially outer border of the recess 6.

The mounting connector 3 is made of a bi-metal material. The bi-metal material comprises an inner layer 10 made of steel, preferably made of stainless steel, and an outer layer 11 made of copper. The outer layer 11 ends, however, before reaching the flange 7, i.e. the flange 7 is free of copper.

The mounting connector 3 can be produced by deep-drawing, i.e. it forms a deep-drawn part. The bi-metal material can be in form of steel sheet material, in particular a stainless-steel sheet material, which is cladded by a copper layer. In this way a stable connection between the copper and the steel is achieved which is not affected by the deep-drawing process.

Alternatively or in addition it is possible to produce in a first step the mounting connector by deep-drawing from the steel sheet material, in particular with stainless-steel sheet material, and then coating the deep-drawn part with a copper layer.

The inner layer 10 comprises a thickness in a range from 0.2 to 2 mm, in particular from 0.7 to 1.5 mm. This gives sufficient mechanical stiffness and a low thermal conductivity, the purpose of which will be explained below.

The outer layer 11 comprises a thickness in a range from 5% to 20% of the thickness of the inner layer 10. In this way good soldering properties of the mounting connector 3 are achieved and at the same time the thermal conductivity can be kept low.

The mounting connector 3 is in form of a tube having a first section 12, a second section 13 and a third section 14. The first section 12 comprises a first diameter. The second section 13 comprises a second diameter and the third section 14 comprises a third diameter. The first diameter is larger than the second diameter and the third diameter. The third diameter is smaller than the first diameter and smaller than the second diameter. Accordingly, a step 15 is formed between the second section 13 and the third section 14. This step 15 forms an insertion stop surface, when the mounting connector 3 is inserted into an opening of a tube, pipe or other part of a system in which properties of a fluid should be monitored.

The front face 5 with the recess 6 forms a mounting section of the housing 2. A protrusion 16 extends from the mounting section. The protrusion 16 is basically of cylindrical form. A small gap 17 is formed between the first section 12 and the protrusion 16. This gap allows for an escape of welding gases during the welding process. The protrusion 16 contributes to the mechanical stability of the mounting connector 3 when connected to the housing 2.

A channel 18 is provided in the protrusion 16. The channel 18 forms a small path for a fluid into the interior 19 of the housing 2. The fluid can enter the mounting connector 3 via an opening 20 which is provided in the third section 14, in particular in an end face of the third section 14.

The mounting connector 3 encloses a hollow 21 between the opening 20 and the protrusion 16.

The sensor arrangement 1 can be mounted to a pipe, tube or other part of a system, for example a refrigeration system, a chiller and NC or heat pump system. To this end the pipe, tube or other part is provided with a hole in which the third section 14 of the sensor arrangement 1 is inserted. The step 15 forms an insertion stop.

Since the outer layer 11 is made of copper, soldering between the mounting connector 3 and the part of the system can easily be done by using a propane torch and solder.

During such a soldering process heat is produced. The construction of the mounting connector 3 has the advantage that this heat has to overcome a quite large thermal resistance before reaching the housing 2. In this way the thermal load of the interior of the housing in which there may be sensors or the like, can be reduced.

The thermal conductivity is kept low by using steel, in particular stainless steel, for the inner layer 10. A good thermal conductivity is achieved only by the outer layer 11. However, since the outer layer 11 has a comparatively small thickness, the thermal resistance is high as well.

Due to the low thermal conductivity of the mounting connector 3 the mounting connector 3 can be kept short thus reducing the risk of damages caused by vibrations or shock.

On the other hand, a connection between the mounting connector 3 and the housing 2 can be made by the welding seam 8 without affecting the thermal conductivity of the welding connector 3, but ensuring a very stable connection between the mounting connector 3 and the housing 2.

The use of stainless steel is preferred, since stainless steel has a very low thermal conductivity.

When deep-drawing the mounting connector 3 the final properties of the outer layer 11, i.e. the outer copper surface, can be easier determined. The properties of the outer layer 11 are neither affected by the deep-drawing process.

The outer layer 11 can as well be coated to the mounting connector 3 after connecting the inner layer 10 to the housing 2.

The housing, at least the mounting section 5, 6 of the housing, can be made of stainless steel as well.

Figure 3:
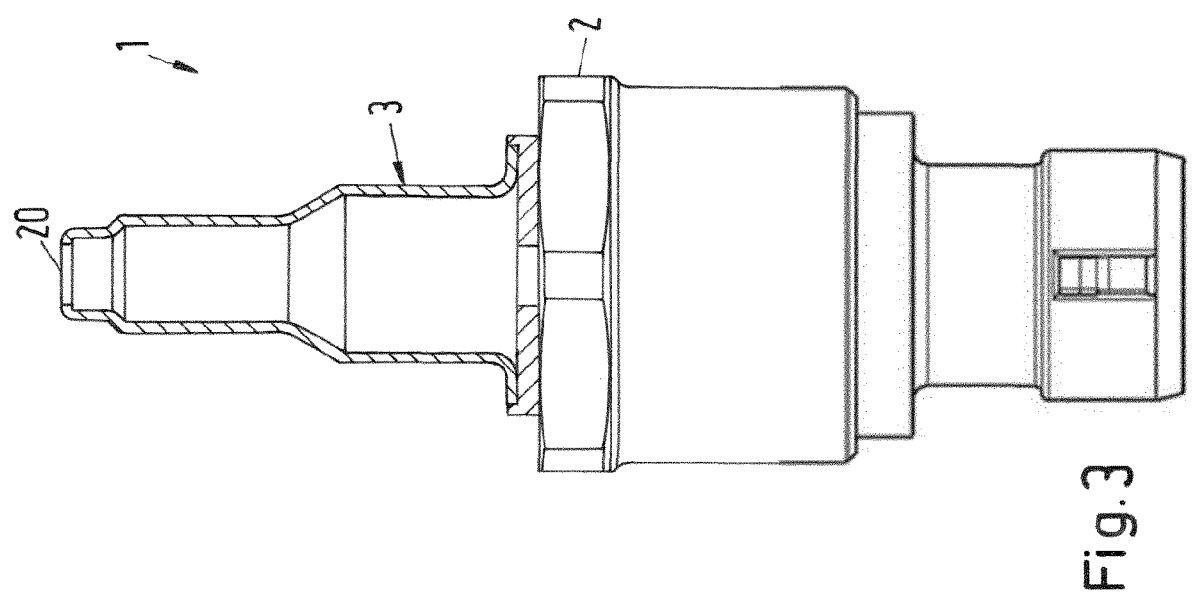
FIG. 3 shows a side view of another embodiment of a sensor arrangement.

FIG. 3 shows another embodiment of a sensor arrangement corresponding basically to the embodiment shown in FIG. 1. However, in this embodiment the protrusion 16 has been omitted. The mounting connector 3 is still welded to the recess in the step.

While the present disclosure has been illustrated and described with respect to a particular embodiment thereof, it should be appreciated by those of ordinary skill in the art that various modifications to this disclosure may be made without departing from the spirit and scope of the present disclosure.

What is claimed is:

1. A sensor arrangement comprising a sensor housing and a mounting connector, wherein the mounting connector has a first portion made of a bi-metal material with an inner layer of steel and an outer layer of copper and a second portion made without the outer layer of copper.

2. The sensor arrangement according to claim 1, wherein the connector is a deep drawn part.

3. The sensor arrangement according to claim 2, wherein the deep-drawn part is made of a copper cladded stainless-steel sheet material.

4. The sensor arrangement according to claim 2, wherein the deep-drawn part is coated with a copper layer after deep-drawing.

5. The sensor arrangement according to claim 1, wherein the inner layer comprises a thickness in a range from 0.2 to 2 mm.

6. The sensor arrangement according to claim 1, wherein the outer layer comprises a thickness in a range from 5% to 20% of the thickness of the inner layer.

7. The sensor arrangement according to claim 1, wherein the mounting connector is connected to a mounting section of the housing, wherein the mounting section comprises a recess and the mounting connector comprises a flange, wherein the flange is arranged in the recess.

8. The sensor arrangement according to claim 7, wherein the flange is free of copper.

9. The sensor arrangement according to claim 7, wherein the mounting section comprises a step.

10. The sensor arrangement according to claim 7, wherein the mounting section comprises a protrusion extending from the mounting section.

11. The sensor arrangement according to claim 10, wherein the protrusion extends from a front face of the step.

12. The sensor arrangement according to claim 1, wherein the mounting connector is in form of a connector tube.

13. The sensor arrangement according to claim 12, wherein the connector tube is of cylindrical form.

14. The sensor arrangement according to claim 12, wherein the connector tube comprises at least a first section having a first diameter and a second section having a second diameter smaller than the first diameter, wherein the first section is arranged closer to the housing than the second section.

15. The sensor arrangement according to claim 14, wherein the connector tube comprises at least a third section having a third diameter smaller than the first diameter and the second diameter, wherein the third section is arranged at an end of the connector tube remote from the mounting area.

16. The sensor arrangement according to claim 15, wherein the third section comprises an opening in an end section.

17. The sensor arrangement according to claim 3, wherein the deep-drawn part is coated with a copper layer after deep-drawing.

18. The sensor arrangement according to claim 2, wherein the inner layer comprises a thickness in a range from 0.2 to 2 mm.

19. The sensor arrangement according to claim 3, wherein the inner layer comprises a thickness in a range from 0.2 to 2 mm.

20. The sensor arrangement according to claim 4, wherein the inner layer comprises a thickness in a range from 0.2 to 2 mm.

* * * * *